United States Patent
La Rue et al.

(10) Patent No.: US 7,984,045 B2
(45) Date of Patent: Jul. 19, 2011

(54) SCALABLE DATA EXTRACTION FROM DATA STORES

(75) Inventors: Denise A. La Rue, Sammamish, WA (US); Altaf A. Gilani, Bellevue, WA (US); Christoph Schuler, Mercer Island, WA (US); John P. Burrows, Seattle, WA (US); Oleg G. Ovanesyan, Redmond, WA (US); Rakesh Gupta, Hyderabad (IN); Thomas A. J. Mechelke, Seattle, WA (US); Yilei Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1175 days.

(21) Appl. No.: 11/369,775

(22) Filed: Mar. 7, 2006

(65) Prior Publication Data
US 2007/0214127 A1 Sep. 13, 2007

(51) Int. Cl.
*G06F 7/00* (2006.01)
*G06F 17/30* (2006.01)

(52) U.S. Cl. ...................................... 707/720
(58) Field of Classification Search .................. None
See application file for complete search history.

(56) References Cited

OTHER PUBLICATIONS

Nadkarni et al., "Data Extraction and Ad Hoc Query of an Entity-Attribute-Value Database", Journal of the American Medical Informatics Associations, vol. 5, No. 6, pp. 511-527, 1998.*
Gaber et al., "Adaptive mining techniques for data streams using algorithm output granularity", Proceedings of the Australasian Data Mining Workshop, Held in conjunction with the Congress on Evolutionary Computation, 2003.*

* cited by examiner

*Primary Examiner* — Michael Hicks
(74) *Attorney, Agent, or Firm* — Merchant & Gould P.C.

(57) ABSTRACT

Extraction of data employing a sequence of remote function calls in form of a synchronous multi-batch call chain is provided. Sequencing of calls is enabled by generating parameters associated with the extraction of a next batch of data. The parameterized, dynamic generation of queries allows for optimization of memory utilization by batching result sets and data conversion. Each subsequent call retrieves a packet of data, picking up where the previous call left off without an overlap. Parameters are updated after each call based on extracted data, available memory, and the like.

20 Claims, 10 Drawing Sheets

302 → Client Query:
SELECT * FROM TABLE

304 → BufferSize:
BufferSize = 3 rows

310 →

| PK1 | PK2 | PK3 | Data |
|---|---|---|---|
| 1000 | A | 1 | Cat |
| 1000 | A | 2 | Dog |
| 1000 | A | 3 | Fish |
| 1000 | A | 4 | Bird |
| 1000 | A | 5 | Snake |
| 1000 | B | 1 | Catfish |
| 1001 | B | 2 | Chair |

*FIG. 3*

Batch 1 Query 1

402 → Generated Query:
SELECT TOP 3 *
FROM TABLE
WHERE
PK1 is not null AND
PK2 is not null AND
PK3 is not null
ORDER BY PRIMARY KEY 404 → PK Where Return Values:

| Column | Operator | Value |
|---|---|---|
| PK1 | = | 1000 |
| PK2 | = | A |
| PK3 | > | 3 |

406 → Query Result:

| PK1 | PK2 | PK3 | Data |
|---|---|---|---|
| 1000 | A | 1 | Cat |
| 1000 | A | 2 | Dog |
| 1000 | A | 3 | Fish |
| 1000 | A | 4 | Bird |
| 1000 | A | 5 | Snake |
| 1000 | B | 1 | Catfish |
| 1001 | B | 2 | Chair |

408 → Control Values:
MoreData = True
RemainingBuffer = 0

*FIG. 4*

Batch 2 Query 1

502 → Generated Query:
SELECT TOP 3 *
FROM TABLE
WHERE
PK1 = 1000 AND
PK2 = A AND
PK3 >3
ORDER BY PRIMARY KEY 504 → PK Where Return Values:

| Column | Operator | Value |
|---|---|---|
| PK1 | = | 1000 |
| PK2 | > | A |
| PK3 | Not null | |

506 → Query Result:

| PK1 | PK2 | PK3 | Data |
|---|---|---|---|
| 1000 | A | 1 | Cat |
| 1000 | A | 2 | Dog |
| 1000 | A | 3 | Fish |
| 1000 | A | 4 | Bird |
| 1000 | A | 5 | Snake |
| 1000 | B | 1 | Catfish |
| 1001 | B | 2 | Chair |

508 → Control Values:
MoreData = True
RemainingBuffer = 1 row

*FIG. 5*

Batch 2 Query 2

602 → Generated Query (internal):
SELECT TOP 1 *
FROM TABLE
WHERE
PK1 = 1000 AND
PK2 > A AND
PK3 is not null
ORDER BY PRIMARY KEY 604 → PK Where Return Values:

| Column | Operator | Value |
|---|---|---|
| PK1 | = | 1000 |
| PK2 | = | B |
| PK3 | > | 1 |

606 → Query Result:

| PK1 | PK2 | PK3 | Data |
|---|---|---|---|
| 1000 | A | 1 | Cat |
| 1000 | A | 2 | Dog |
| 1000 | A | 3 | Fish |
| 1000 | A | 4 | Bird |
| 1000 | A | 5 | Snake |
| 1000 | B | 1 | Catfish |
| 1001 | B | 2 | Chair |

608 → Control Values:
MoreData = True
RemainingBuffer = 0 rows

*FIG. 6*

Batch 3 Query 1

702 → Generated Query:
SELECT TOP 3 *
FROM TABLE
WHERE
PK1 = 1000 AND
PK2 = B AND
PK3 > 1
ORDER BY PRIMARY KEY 704 → PK Where Return Values:

| Column | Operator | Value |
|---|---|---|
| PK1 | = | 1000 |
| PK2 | > | B |
| PK3 | Not null | |

706 → Query Result:

| PK1 | PK2 | PK3 | Data |
|---|---|---|---|
| 1000 | A | 1 | Cat |
| 1000 | A | 2 | Dog |
| 1000 | A | 3 | Fish |
| 1000 | A | 4 | Bird |
| 1000 | A | 5 | Snake |
| 1000 | B | 1 | Catfish |
| 1001 | B | 2 | Chair |

708 → Control Values:
MoreData = True
RemainingBuffer = 3 rows

*FIG. 7*

Batch 3 Query 2

802 → Generated Query (internal):
SELECT TOP 3 *
FROM TABLE
WHERE
PK1 = 1000 AND
PK2 > B AND
PK3 is not null
ORDER BY PRIMARY KEY 804 → PK Where Return Values:

| Column | Operator | Value |
|--------|----------|-------|
| PK1    | >        | 1000  |
| PK2    | Not null |       |
| PK3    | Not null |       |

806 → Query Result:

| PK1  | PK2 | PK3 | Data    |
|------|-----|-----|---------|
| 1000 | A   | 1   | Cat     |
| 1000 | A   | 2   | Dog     |
| 1000 | A   | 3   | Fish    |
| 1000 | A   | 4   | Bird    |
| 1000 | A   | 5   | Snake   |
| 1000 | B   | 1   | Catfish |
| 1001 | B   | 2   | Chair   |

808 → Control Values:
MoreData = True
RemainingBuffer = 3 rows

*FIG. 8*

Batch 3 Query 3

902 → Generated Query (internal):
SELECT TOP 3 *
FROM TABLE
WHERE
PK1 > 1000 AND
PK2 is not null
PK3 is not null
ORDER BY PRIMARY KEY 904 → PK Where Return Values:

| Column | Operator | Value |
|--------|----------|-------|
| PK1    | >        | 1000  |
| PK2    | Not null |       |
| PK3    | Not null |       |

906 → Query Result:

| PK1  | PK2 | PK3 | Data    |
|------|-----|-----|---------|
| 1000 | A   | 1   | Cat     |
| 1000 | A   | 2   | Dog     |
| 1000 | A   | 3   | Fish    |
| 1000 | A   | 4   | Bird    |
| 1000 | A   | 5   | Snake   |
| 1000 | B   | 1   | Catfish |
| 1001 | B   | 2   | Chair   |

908 → Control Values:
MoreData = False
RemainingBuffer = 2 rows

SCALABLE DATA EXTRACTION FROM DATA STORES

BACKGROUND

Techniques used by organizations to build a data warehousing system commonly employ either a top-down or bottom-up development approach. In the top-down approach, an enterprise data warehouse (EDW) is built in an iterative manner, business area by business area, and underlying dependent data marts are created as required from the EDW contents. In the bottom-up approach, independent data marts are created with the view to integrating them into an enterprise data warehouse at some time in the future.

Some data extraction systems (e.g. SAP) do not provide a flexible mechanism for extracting large amounts of data from enterprise level data warehouses. Remote function call (RFC) is one approach for remotely executing a function in a database system such as SAP. The maximum size of the result set within a remote function call is limited by the available physical memory on the database server and the client machine. Therefore, it is often not possible to extract all the data for a given SELECT statement against a large table using this access method.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Aspects are directed to breaking down the retrieval of data into a sequence of remote function calls with each subsequent call retrieving a packet of data, picking up where the previous call left off without an overlap.

Sequencing of calls is enabled by generating parameters associated with the extraction of a next batch of data. The parameterized, dynamic generation of queries allows for optimization of memory utilization by batching result sets and data conversion.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, available memory in client and application server machines is commonly limits a maximum size of a result set in extracting data from a data store based on a client query. Therefore, it is often not possible to extract all the data for a given SELECT statement against a large data table using remote function calls. Embodiments are directed to retrieval of data in batches from the data store using sequenced remote function calls (RFCs). In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
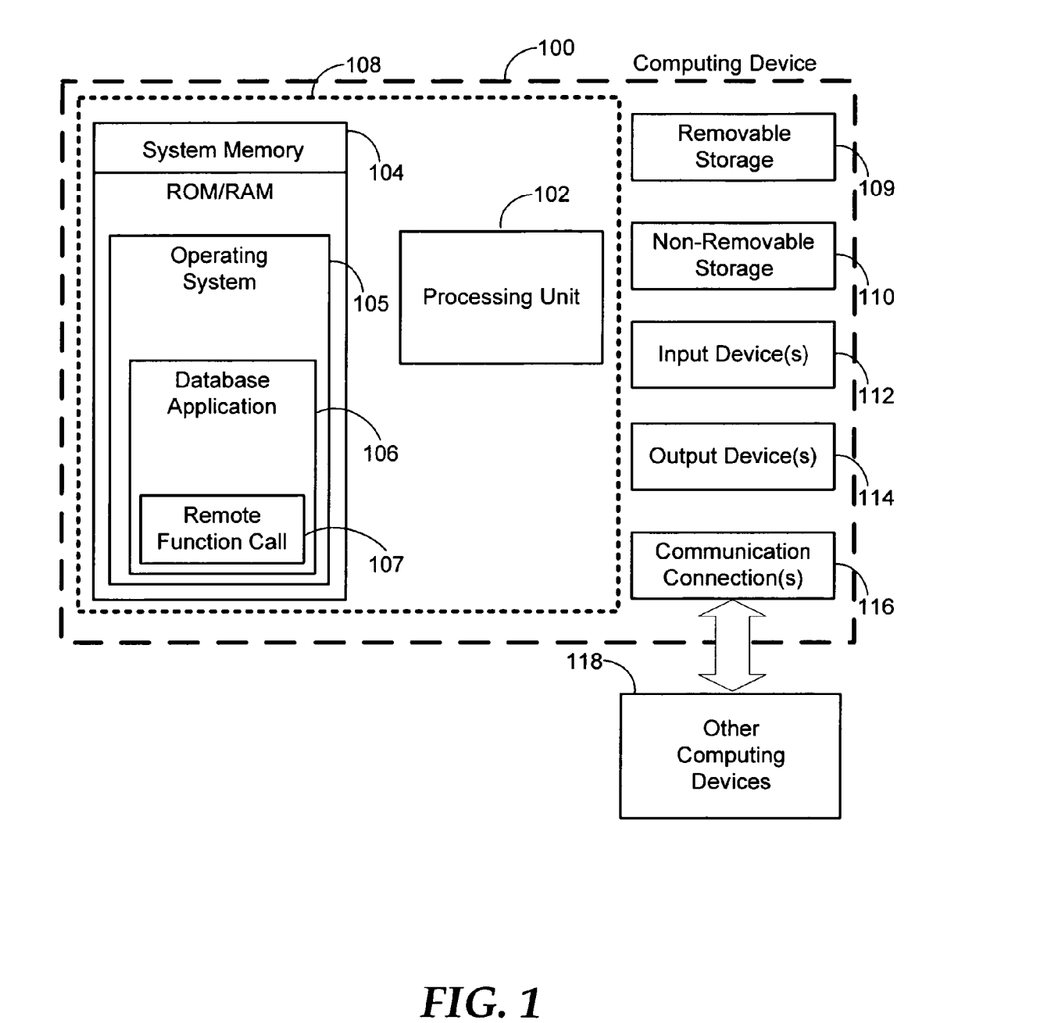
FIG. 1 is a block diagram of an exemplary computing operating environment.

Referring now to the drawings, in which like numerals refer to like elements through the several figures, aspects and an exemplary computing operating environment will be described. FIG. 1 and the following discussion are intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the embodiments includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications such as database application 106, and may include remote function call 107. This basic configuration is illustrated in FIG. 1 by those components within dashed line 108.

According to embodiments, the database application 106 may comprise many types of programs that perform actions associated with one or more data stores such as storing and/or extracting data from a data store based on a client query. An example of such programs is ACCESS® manufactured by MICROSOFT CORPORATION. Database application 106 may also comprise a multiple-functionality software application for providing many other types of functionalities. Such a multiple-functionality application may include a number of program modules, such as a word processing program, a spreadsheet program, a database program, and the like.

Remote Function Call (RFC) 107 is an application program interface (API) to SAP® (System, Applications, and Products in Data Processing) applications. SAP customers who wish to write other applications that communicate with SAP applications and databases can use the RFC interface to do so. SAP applications provide the capability to manage financial, asset, and cost accounting, production operations and materials, personnel, plants, and archived documents. The applications can run on a number of platforms including various versions of WINDOWS® operating system by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
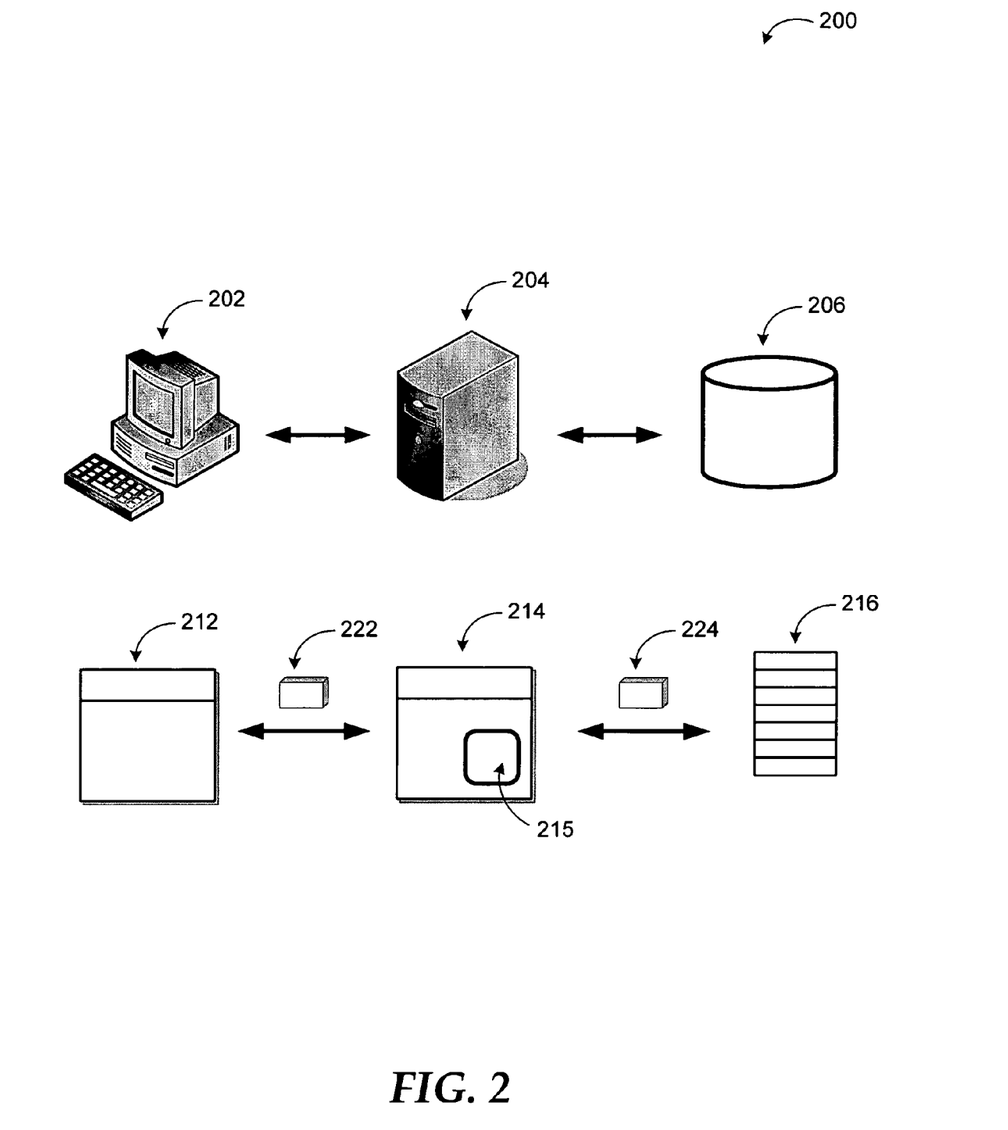
FIG. 2 illustrates a system where example embodiments may be implemented.

Referring to FIG. 2, a system where example embodiments may be implemented, is illustrated. System 200 includes client 202, application server 204, and data store 206. The term "client" may refer to a client application or a client device employed by a user to access data stored in data store 206. Application server 204 may also be one or more programs or a server machine executing programs associated with the application server tasks. Both client 202 and application server 204 may be embodied as single device (or program) or a number of devices (programs). Similarly, data store 206 may include one or more data stores such as a data warehouse.

Client 202, application server 204, and data store 206 may communicate over one or more networks. The network(s) may include a secure network such as an enterprise network, or an unsecure network such as a wireless open network. By way of example, and not limitation, the network(s) may include wired media such as a wired network or direct-wired connection, and wireless media such as acoustic, RF, infrared and other wireless media.

In a typical implementation, an application 212 running on client 202 may request data from an application 214 running on application server 204. The request may be in form of a query or in other forms. Application 214 may process the request and retrieve data the from data store 206 (e.g. data table 216). The processing of the request and retrieval of data may include many actions such as translation of a query into multiple queries.

In some embodiments, application 114 may include an RFC module 215 that is used as the API between the client application 212 and application 214. Data packet(s) 224 retrieved from data store 206 may be transformed by application 214 and provided to client 202 as data packet(s) 222.

Activities performed by the applications are not limited to retrieval of data from data store 206. Additional activities may include sending data from client 202 to application server 204 for storage at data store 206, and the like.

An algorithm according to embodiments may be used in a synchronous multi-batch call chain that allows extraction of large datasets. The client may control an amount of data extracted in one batch by setting a SetRowcount parameter to a value small enough to fit a result set into available memory on the client and/or the application server. The client may request the next batch of data (if there is more data) once enough memory is available, until the complete requested result set has been extracted. The following section is an example implementation of an actual query.

The packet size parameters may include environment variables, configuration items, registry entries, and the like. A user may modify the parameters to better suit their particular implementation. The packet size parameters may also be adjusted during execution after the first packet is selected, as at that time more is known about the selection and results specified by the query. The inputs for packet size may be specified in bytes and then converted internally in the application server to rows, as this may be the definition of packet size expected by the RFC.

The RFC may support two parameters for packet size, one for the client buffer and one for the application server buffer. The RFC may understand rows for both buffer sizes.

In synchronous mode packet size fulfills the function of keeping the memory consumption reasonable and enables larger result sets for the synchronous mode. Packet size on the client-side is the parameter that defines the number of rows per query.

The example data transfer is for an extract of 550,000 rows from a system. Assuming the client buffer can hold up to 200,000 rows, the server process has memory for 250,000 rows total for read and output buffer. For the data transfer the client buffer row count may be set to the smaller of the two buffers, for example, 200,000.

In order for the RFC to return 200,000 rows, the server needs to be able to read, convert, and store the converted data in a buffer until control is returned. Packet_size controls the buffer size of the read buffer. SetRowCount controls the size of the output buffer.

In the example scenario with packet_size at 50,000, the RFC reads, converts, and adds to the output buffer four read buffers of 50,000 rows each. Once the RFC reaches 200,000 rows (SetRowCount) it may determine the PK Where clause for row 200,001+ and return control. If the RFC is called with the same parameters again (including the updated PK Where clause), it continues where the last chunk of data was left.

The choice of mode may be transparent to the user, the application server and the RFC may decide if additional calls are necessary to complete the user SELECT. In the multi-batch call chain, one synchronous call cannot be used to receive the results. The result set is larger than can be returned in the single synchronous call. For example, the row limit that can be returned may be about 300,000 before the work process runs out of allocated memory, and the user query may return 1,000,000 rows. In order to perform this extract the application server uses the multiple synchronous call chain. When the query is sent in, the application server may know that it will result in a synchronous call-chain, and it may simply send in the user SELECT as a single synchronous call with following steps:

The user SELECT is sent from the application server with a packet size parameter (SetRowCount) of 100,000 rows (as defined in the packet size configuration of the application server).

The extract RFC generates the SELECT including the primary keys for the data table even though they do not need be specified in the end user SELECT. This SELECT generated by the RFC has an added Where clause for the primary keys and a limit of the first 100,000 rows (the packet size). The order by primary keys makes sure that the first 100,000 rows are retrieved. The RFC performs the SELECT and determines that there is more data to be returned for the original user SELECT in another packet. The RFC indicates this by sending back an export parameter (e.g. MoreData=1 or a similar value). Next, the RFC also sends back the next fully formed SELECT with the updated primary key values in the Where clause in an outbound table the same form as the inbound Where table.

The application server receives the result set for the first packet of data (the first 100,000 rows of the total result set), the MoreData parameter, and the next Where clause for the next packet of 100,000 records. At this point, the application server determines that a multiple synchronous call-chain is being executed since the MoreData parameter has a value and the outbound Where clause table has the next SELECT in it. The application server sends in the next Where clause. The RFC performs its tasks and returns the data, the MoreData parameter, and the next Where clause for the next 100,000 rows.

This process continues until the MoreData parameter value is set to a value corresponding to no more data (e.g. More-Data=0) and a result set equal to or less than 100,000 is received from the RFC. The user may not be aware that the application server is making numerous calls.

Figure 3:
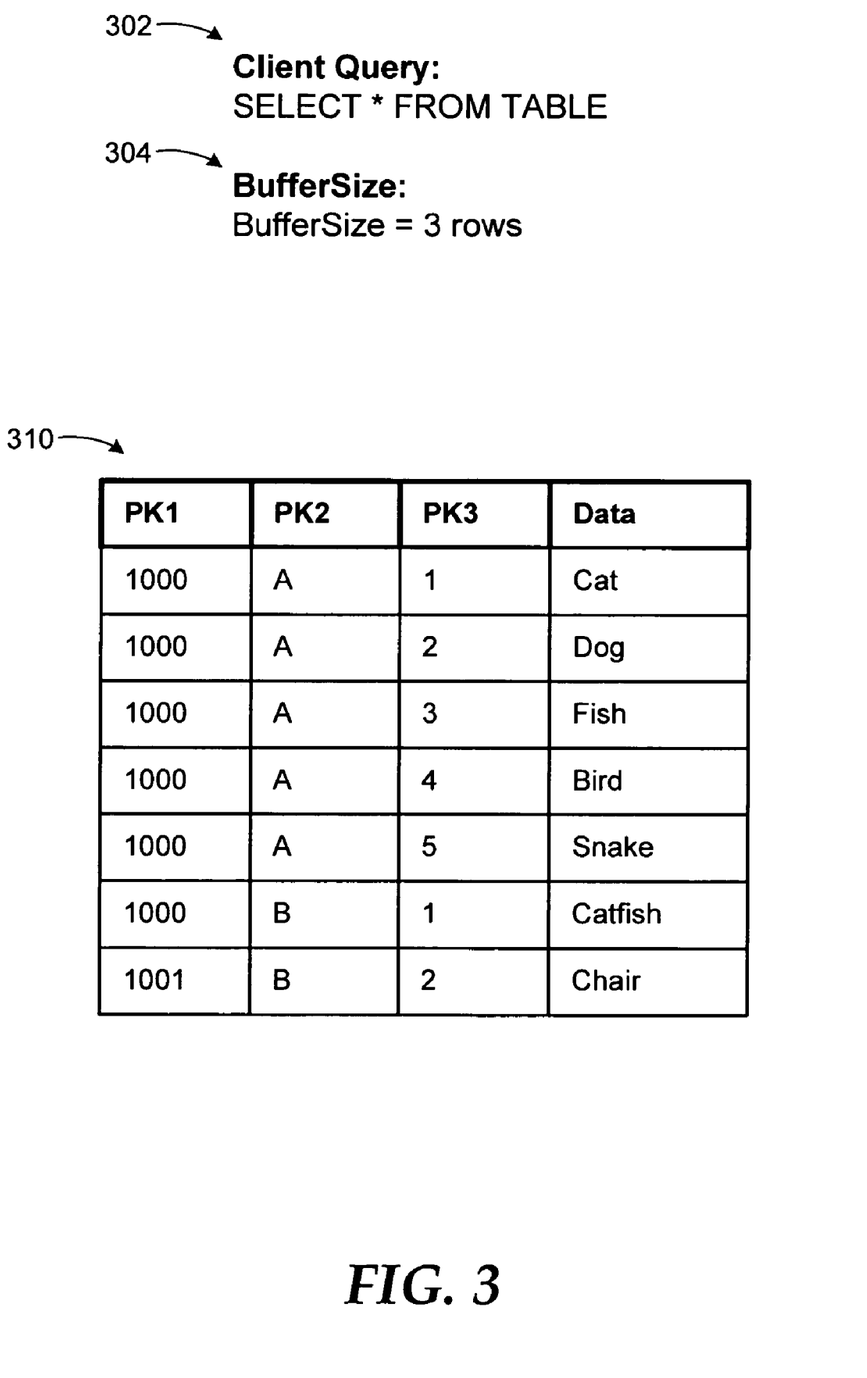
FIG. 3 illustrates an example data table along with an example client query and available memory.

Now referring to FIG. 3, an example data table is shown along with an example client query and available memory.

Example data table 310 includes three columns for Primary Key (PK) values, PK1, PK2, and PK3, as well as the data column. Client query 302 is "SELECT" from table (referring to example data table 310. Finally, available memory is shown by buffer size 304 as three rows. The example data table and the example client query are used in FIGS. 4 through 9 to illustrate data retrieval in batches and generation of internal queries to accommodate available memory limitation according to embodiments.

Figure 4:
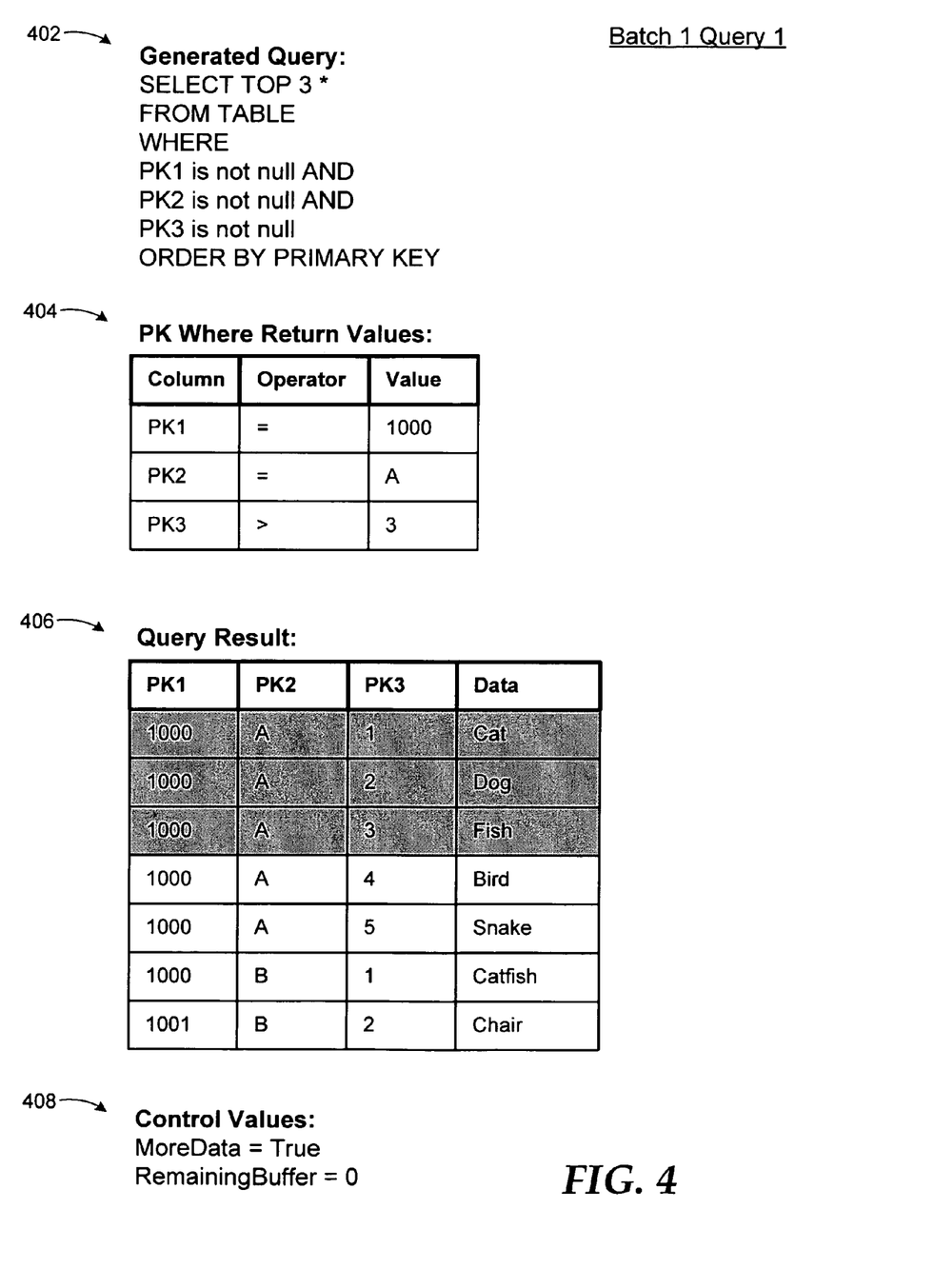
FIG. 4 illustrates a generated query, PK Where clause return values, a query result table, and control values for a first batch of data based on the example data table and query of FIG. 3 according to one embodiment.

FIG. 4 illustrates a generated query, PK Where clause return values, a query result table, and control values for a first batch of data based on the example data table and query of FIG. 3 according to one embodiment. As explained previously, an internal query (generated query 402) is generated based on the client query, available memory, and other packet size parameters. In the example of FIG. 3 with three PK values, the generated query begins with selecting the top three rows from the example data table with a PK Where clause and ordering the results by the primary key values. The PK values for the PK Where clause of generated query 402 are PK1, PK2, and PK3 being not null.

Based on the generated query 402, query result table 406 shows the first three rows highlighted. The data in these three rows is transferred in the first batch. Thus, the original seven row example table is reduced to a three row table to accommodate the available memory (buffer size=3 rows).

Once the query result is obtained, PK Where clause return values are determined for use with the subsequent batch of data packets. In the example case, the return PK values are shown in table 404 as PK1=1000, PK2=A, and PK3>3. These values are used in generating the subsequent internal query for the second batch of data packets.

Control values 408 lists two additional packet size parameters: MoreData=True (more data remains) and Remaining-Buffer=0 (first batch completely uses available memory).

Figure 5:
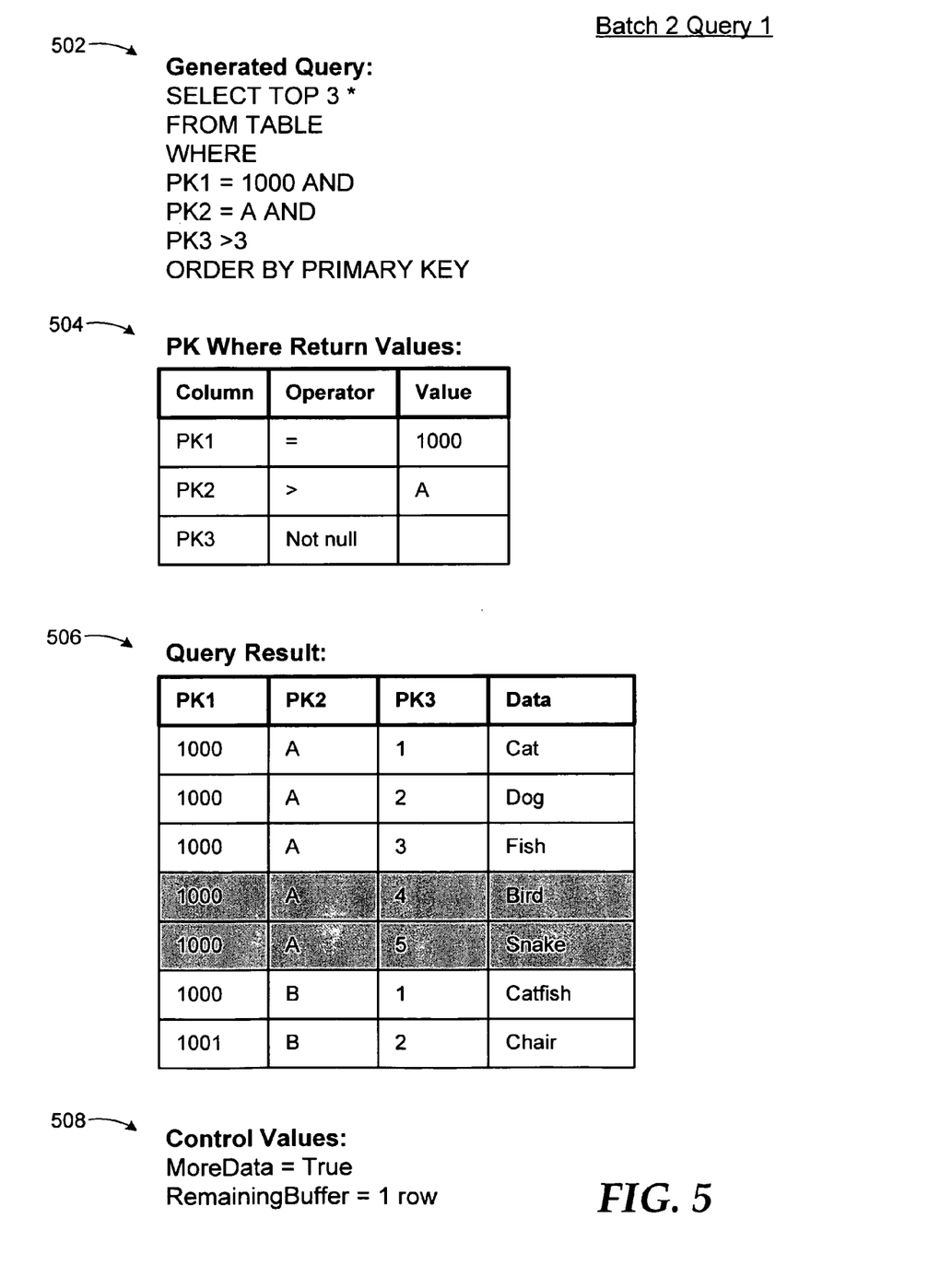
FIG. 5 illustrates the query, the result table, and the values of FIG. 4 for a first query of a second batch of data based on the example data table and query of FIG. 3.

A generated query, PK Where clause return values, a first query result table, and control values for the second batch of data are shown in FIG. 5 following the results of FIG. 4 for the first batch.

As mentioned above, the return PK values from the first batch are used in generated query 502 (PK1=1000, PK2=A, and PK3>3). The generated query 502 again selects the top three rows from the example data table and orders by primary key values. Under the conditions set by the PK Where clause, the query result table 506 shows only two rows highlighted, which meet the conditions (rows 4 and 5). Thus, first query of second batch of data packets only fills two rows of the available three row buffer size.

Because the first query of the second batch does not fill the available memory, a second query will be generated. The PK Where clause return values for the second query of the second batch as shown in table 504 are PK1=1000, PK2>A, and PK3 not null. The control values (additional packet size parameters) are MoreData=True and RemainingBuffer=1 row.

Figure 6:
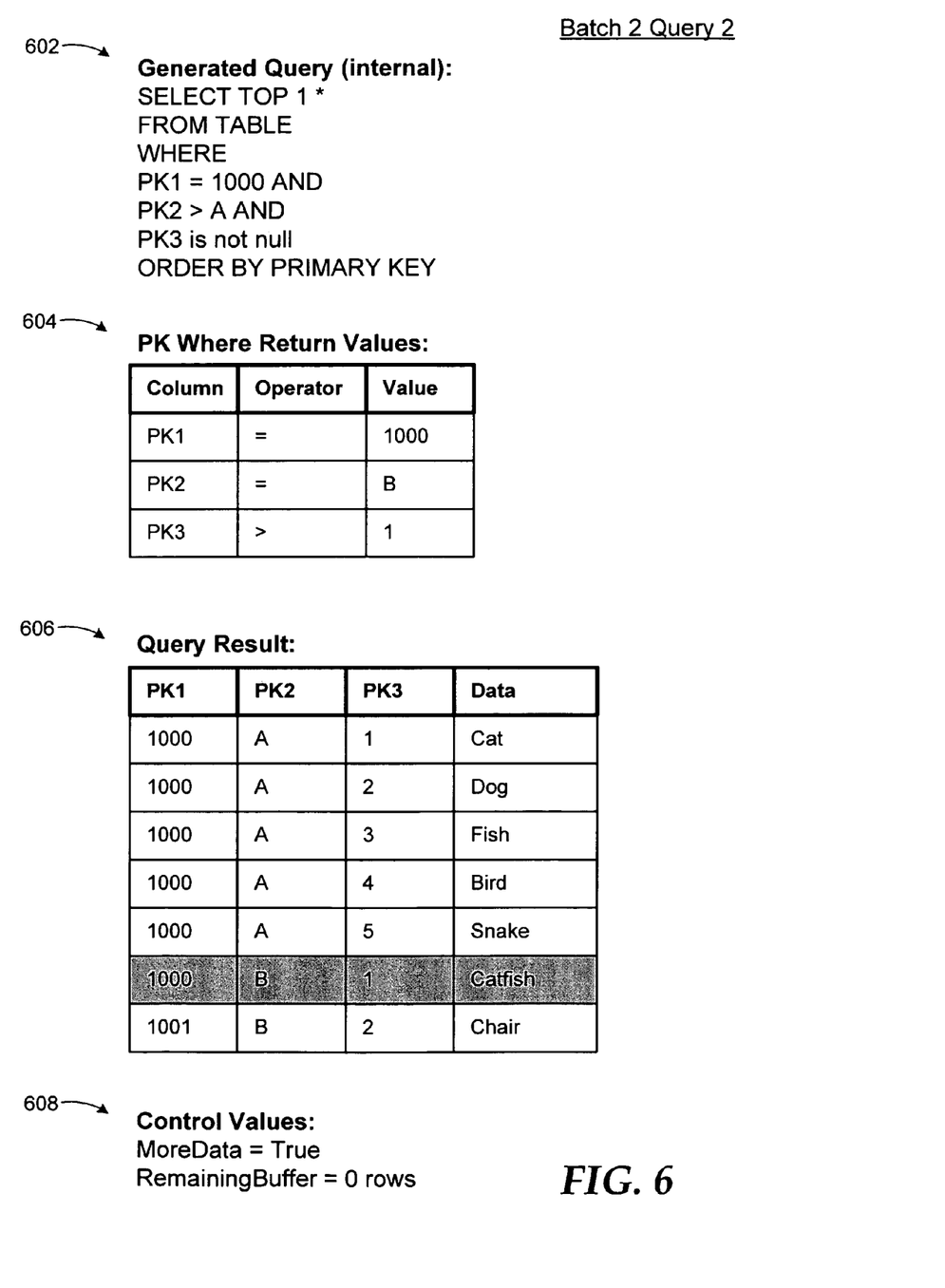
FIG. 6 illustrates the query, the result table, and the values of FIG. 4 for a second query of the second batch of data based on the example data table and query of FIG. 3.

FIG. 6 illustrates the second internally generated query, PK Where clause return values, a second query result table, and control values for the second batch of data following the first query for the second batch shown in FIG. 5.

The second generated query 602 includes PK conditions PK1=1000, PK2>A, and PK3 not null as specified in the PK Where clause return values of FIG. 5. Because space for a single row remains in the buffer, top 1 row is to be selected in this instance. Ordering is still done based on the primary key values.

Based on the conditions in generated query 602, the sixth row of query result table 606 is selected for retrieval. As a result of this selection, the PK Where clause return values as shown in table 604 are PK=1000, PK2=B, and PK3>1. The control values are MoreData=True (still more data remains to be retrieved) and RemainingBuffer=0 rows (second batch has filled the available memory space).

Figure 7:
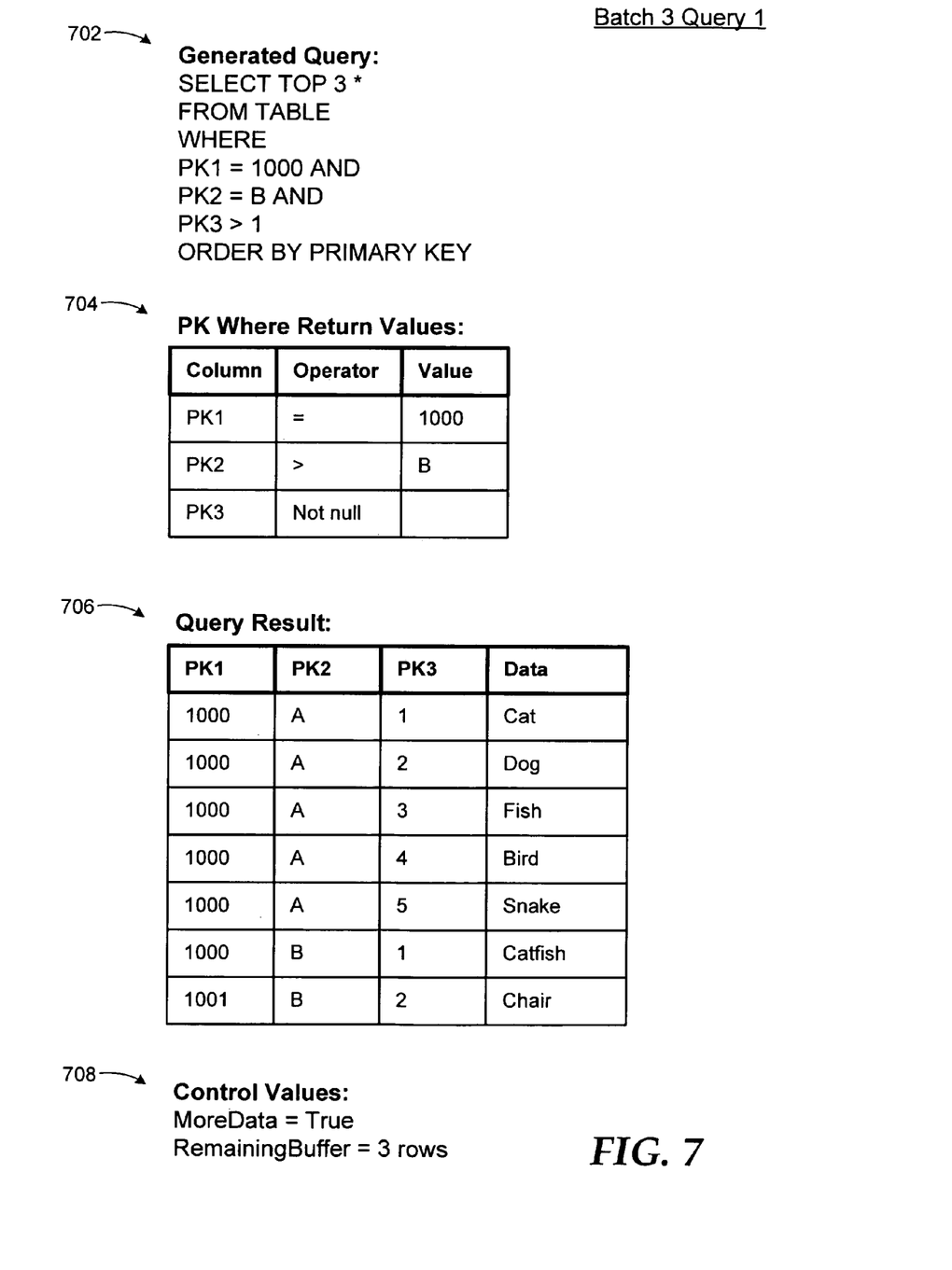
FIG. 7 illustrates the query, the result table, and the values of FIG. 4 for a first query of a third batch of data based on the example data table and query of FIG. 3.

FIG. 7 illustrates a first generated query, PK Where clause return values, a first query result table, and control values for the third batch of data based on the first two batches shown in FIGS. 4, 5, and 6.

The first generated query 702 for the third batch includes PK conditions PK1=1000, PK2=B, and PK3>1 as specified in the PK Where clause return values of FIG. 6. Because the third batch is starting with an empty memory, the top three rows are to be selected again. Ordering is still done based on the primary key values.

Based on the conditions in first generated query 702 for the third batch, no row is selected. While the seventh row of query result table 706, which has not been retrieved yet, meets the last two conditions, its PK1 value does not meet the first condition. Accordingly, no data is retrieved as a result of the first query of the third batch. The PK Where clause return values as shown in table 704 are PK=1000, PK2>B, and PK3 not null. The control values are MoreData=True (still more data remains to be retrieved) and RemainingBuffer=3 rows (no data has been selected for retrieval).

Figure 8:
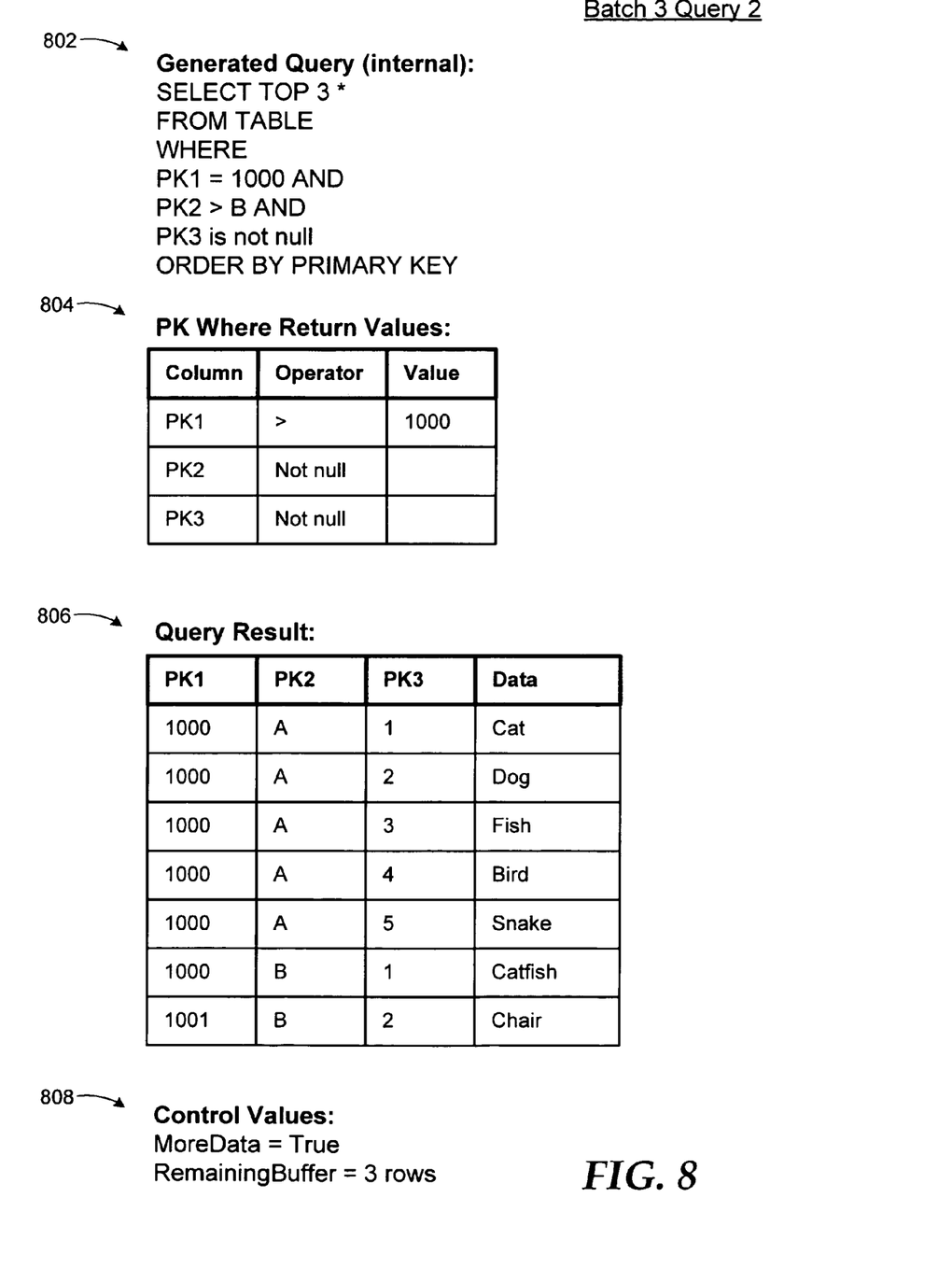
FIG. 8 illustrates the query, the result table, and the values of FIG. 4 for a second query of the third batch of data based on the example data table and query of FIG. 3.

FIG. 8 illustrates the second internally generated query, PK Where clause return values, a second query result table, and control values for the third batch of data. Second query 802 includes the three PK value conditions specified in the PK Where clause return values of FIG. 7 (PK1=1000, PK2>B, and PK3 not null). The top three rows are still to be selected with ordering done based on the PK values.

Second generated query 802 for the third batch results in no rows selected, because none of the rows of query result table 806 meet the conditions. Thus, the PK Where clause return values are modified again to PK1>1000, PK2 not null, and PK3 not null. The control values are MoreData=True (still more data remains to be retrieved) and RemainingBuffer=3 rows (no data has been selected for retrieval).

Figure 9:
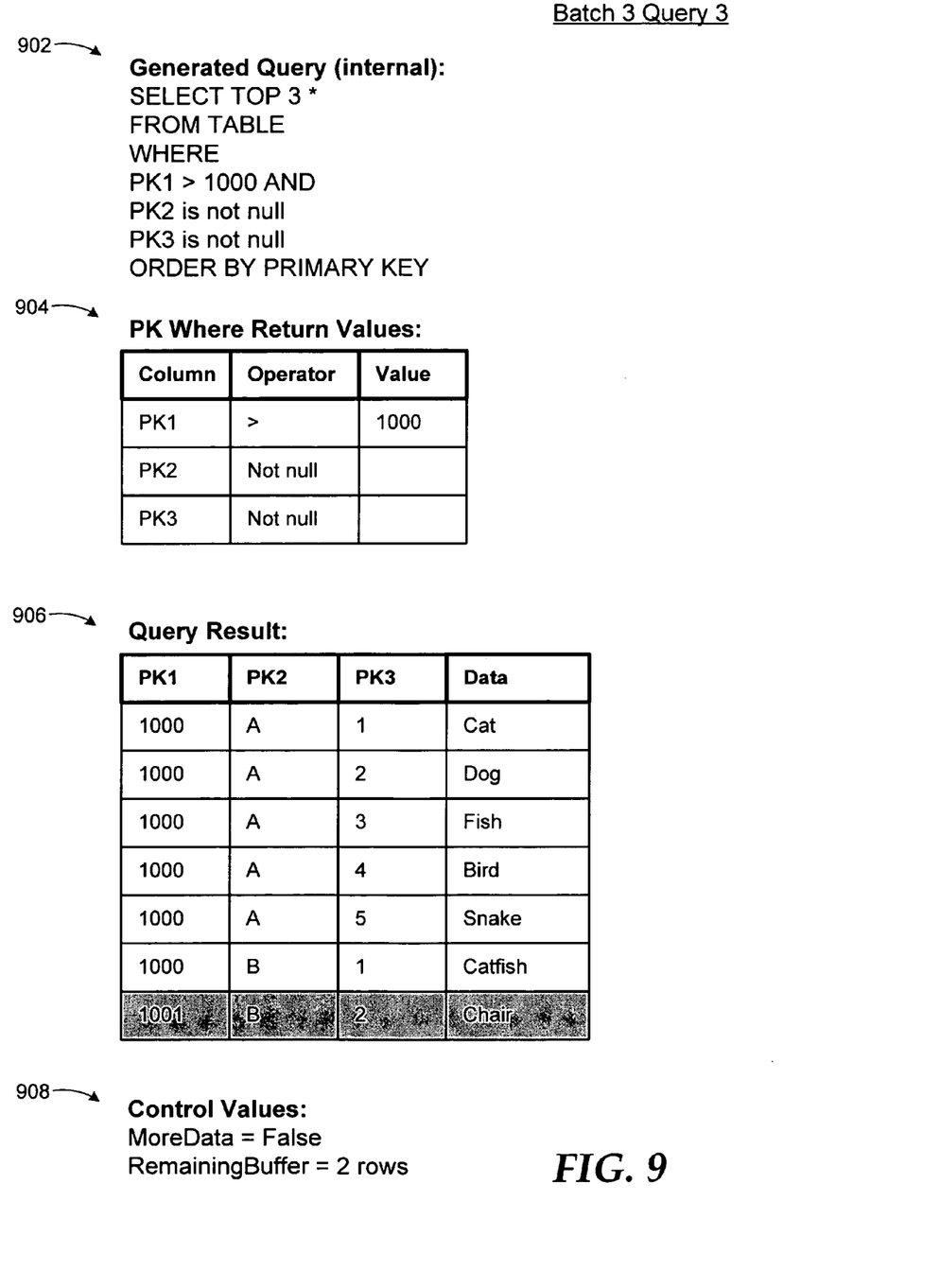
FIG. 9 illustrates the query, the result table, and the values of FIG. 4 for a third query of the third batch of data based on the example data table and query of FIG. 3.

FIG. 9 illustrates the third internally generated query for the third batch, PK Where clause return values, a third query result table, and control values. Third query 902 includes the three PK value conditions specified in the PK Where clause return values of FIG. 8 (PK1>1000, PK2 not null, and PK3 not null). The top three rows are still to be selected with ordering done based on the PK values.

In this instance, row seven of the query result table 906 meets the conditions of generated query 902 and is selected for retrieval. Because the third batch includes the last chunk of data to be retrieved, the PK Where clause return values, as shown in table 904, remain the same (PK1>1000, PK2 not null, and PK3 not null).

As listed under control values 908, packet size parameter MoreData is set to False because no more data remains to be extracted. RemainingBuffer is set to 2 rows because only one row of the three row buffers is filled.

The example implementation of a data extraction algorithm in FIGS. 4 through 9 is intended for illustration purposes only and should not be construed as a limitation on embodiments. Other embodiments using different methods for modifying PK values, generating queries, and using different control values may be implemented using the principles described herein.

Figure 10:
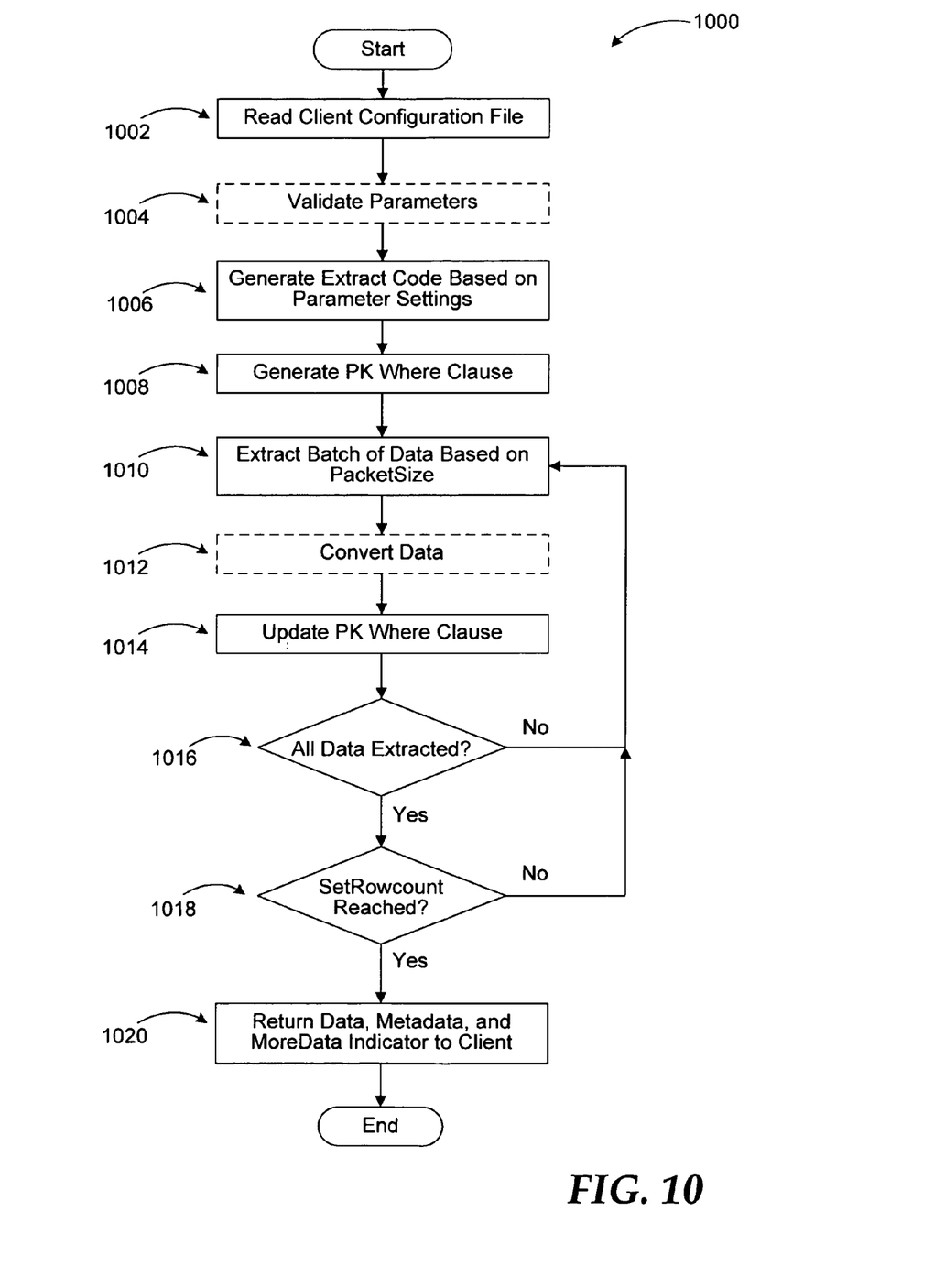
FIG. 10 illustrates a flowchart of a process for extracting data in a broken-down fashion according to embodiments.

FIG. 10 illustrates a flowchart of a process for extracting data in a broken-down fashion according to embodiments. Process 1000 may be implemented in an application like a database program, a data warehouse management program, and the like.

Process 1000 begins with operation 1002, where a client configuration file is read. The client configuration file may include environment variables, configuration items, registry entries, and the like, such as client buffer size. Processing advances from operation 1002 to optional operation 1004.

At optional operation 1004, one or more of the parameters received from the client are validated. Validation may be performed for database definition, row count specification, and the like. Processing moves from optional operation 1004 to operation 1006.

At operation 1006, an extract code is generated based on the parameter settings. The parameters may be set to default values, as received from the client, or modified by the server application. The extract code may include selection criteria (e.g. the top 3 rows in generated query 402 of FIG. 4), ordering information (e.g. order by PK value), and the like. Processing proceeds from operation 1006 to operation 1008.

At operation 1008, a PK Where clause is generated. The PK Where clause includes conditions for extraction of data such that portions of data are extracted as a result of the generated code (query) that does not exceed available memory. Examples of PK Where clause elements are listed previously in FIGS. 4 through 9. Processing moves from operation 1008 to operation 1010.

At operation 1010, a batch of data is extracted using the code generated in operation 1006 and the PK Where clause generated in operation 1008. In a two-dimensional data store setting, rows of a data table are queried and those meeting the conditions of the extract code and the PK Where clause within the code are selected for extraction. Embodiments are not limited to two dimensional data spaces, however. Data extraction using multi-batch synchronous call chains may be implemented in single or multi-dimensional data spaces as well using the principles described herein. Processing proceeds from operation 1010 to optional operation 1012.

At optional operation 1012, the extracted data is converted for transmittal to the client. Such conversion(s) may include changing a format of the data, insertion of metadata, and the like. Processing advances from optional operation 1012 to operation 1014.

At operation 1014, the PK Where clause is updated, and the return values are generated. Conditions of the PK Where clause are modified according to the results of the current extraction. In one scenario, the extracted batch of data may exceed the available memory size. In that case, the condition may be tightened to select a smaller set of data. In another scenario, the available memory space may not be fully utilized while more data remains to be extracted. In that case, the conditions may be relaxed for the next extraction such that the available memory is better utilized.

As described previously, the updated PK Where clause values are internally transmitted to the RFC for subsequent extractions by modifying the generated queries. Processing moves from operation 1014 to decision operation 1016.

At decision operation 1016, a determination is made whether all data is extracted. If no more data remains to be extracted, the last batch is completed and processing moves to decision operation 1018. Otherwise, processing returns to operation 1010 for further extraction of data based on the generated code with the updated PK Where clause values.

At decision operation 1081, a determination is made whether a SetRowCount parameter is reached. The SetRowCount parameter may be defined by the client, set to a default value, or modified by the application server based on packet sizes, available memory, and the like. If the SetRowCount limit has not been reached yet, processing returns to operation 1010 for further extraction of data based on the generated code with the updated PK Where clause values. Otherwise, processing proceeds to operation 1020.

At operation 1020, the extracted data, metadata, and a more data indicator are returned to the client. The client may request more data based on the metadata and the more data indicator as explained previously. After operation 1020, processing moves to a calling process for further actions.

The operations included in process 1000 are for illustration purposes. Extracting data from a data store employing synchronous multi-batch call chain by generating internal queries with updated PK Where clauses may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to be executed at least in part in a computing device for extracting data from a data store, comprising:
   receiving a request for extracting the data;
   generating an internal query based on at least one parameter associated with the request, wherein the at least one parameter comprises a packet size parameter, the packet size parameter comprising one or more of the following: environment variables, configuration items and registry entries, wherein the packet size parameter is adjusted during execution of the query based on query specified results;
   generating an extract code based on at least one parameter setting, the extract code including selection criteria and ordering information, the selection criteria comprising a plurality of rows of data from a data table, the ordering information comprising an order of primary key (PK) values in the data table;
   generating a set of conditions within the internal query based on available memory for data extraction and transfer, the set of conditions comprising a condition that portions of the data extracted as a result of the generated extract code do not exceed the available memory;
   extracting a batch of the data using the generated internal query;
   updating the set of conditions based on the extracted batch of the data and remaining available memory, wherein, when the extracted batch of data exceeds the remaining available memory, updating the set of conditions comprises tightening the set of conditions to select a smaller set of data, and when the remaining available memory is not fully utilized by the extracted batch of data, updating the set of conditions comprises relaxing the set of conditions for a subsequent extracted batch of data such that the remaining available memory is better utilized, wherein the PK values are utilized in generating a subsequent internal query for the subsequent extracted batch of data; and
   extracting another batch of the data using the generated internal query with the updated conditions.

2. The computer-implemented method of claim 1, further comprising:
   continuing to extract the data in batches by updating the set of conditions of the internal query for each extraction until all requested data is extracted.

3. The computer-implemented method of claim 1, further comprising:
   continuing to extract the data in batches by updating the set of conditions of the internal query for each extraction until a control parameter is reached.

4. The computer-implemented method of claim 3, wherein the control parameter is a specified row count.

5. The computer-implemented method of claim 3, wherein the control parameter is a row count dynamically specified by an application server.

6. The computer-implemented method of claim 1, further comprising:
   inserting the updated set of conditions to each batch of extracted data such that the updated conditions are used for a subsequent extraction.

7. The computer-implemented method of claim 1, further comprising:
   converting the extracted batch of data such that it can be transmitted along with a status parameter indicating whether there is more data to be transmitted.

8. The computer-implemented method of claim 7, wherein converting the extracted batch of data includes modifying a format of the data.

9. The computer-implemented method of claim 7, wherein converting the extracted batch of data includes inserting metadata such that a client can interpret the extracted batch of data.

10. The computer-implemented method of claim 1, wherein the request includes at least one parameter from a set of parameters associated with environment variables, configuration settings associated with a client, and registry entries.

11. The computer-implemented method of claim 10, further comprising:
    validating the at least one parameter included in the request.

12. A computer-readable storage medium having computer executable instructions which, when executed on a computer, will cause the computer to perform a method for extracting data from a data store, the method comprising:
    receiving a request for extracting the data;
    generating an internal query based on at least one parameter associated with the request, wherein the at least one parameter comprises a packet size parameter, the packet size parameter comprising one or more of the following:

environment variables, configuration items and registry entries, wherein the packet size parameter is adjusted during execution of the query based on query specified results;

generating an extract code based on at least one parameter setting, the extract code including selection criteria and ordering information, the selection criteria comprising a plurality of rows of data from a data table, the ordering information comprising an order of primary key (PK) values in the data table; generating a set of conditions within the internal query based on available memory for data extraction and transfer, the set of conditions comprising a condition that portions of the data extracted as a result of the generated extract code do not exceed the available memory;

extracting a batch of the data using the generated internal query;

updating the set of conditions based on the extracted batch of the data and remaining available memory, wherein, when the extracted batch of data exceeds the remaining available memory, updating the set of conditions comprises tightening the set of conditions to select a smaller set of data, and when the remaining available memory is not fully utilized by the extracted batch of data, updating the set of conditions comprises relaxing the set of conditions for a subsequent extracted batch of data such that the remaining available memory is better utilized, wherein the PK values are utilized in generating a subsequent internal query for the subsequent extracted batch of data; and extracting another batch of the data using the generated internal query with the updated conditions.

13. The computer-readable storage medium of claim 12, further comprising:

continuing to extract the data in batches by updating the set of conditions of the internal query for each extraction until all requested data is extracted.

14. The computer-readable storage medium of claim 12, further comprising:

continuing to extract the data in batches by updating the set of conditions of the internal query for each extraction until a control parameter is reached.

15. The computer-readable storage medium of claim 14, wherein the control parameter is a specified row count.

16. The computer-readable storage medium of claim 14, wherein the control parameter is a row count dynamically specified by an application server.

17. A computer system for extracting data from a data store, comprising:

a memory for storing executable program code; and a processor, functionally coupled to the memory, the processor being responsive to computer-executable instructions contained in the program code and operative to:

receive a request for extracting the data;

generate an internal query based on at least one parameter associated with the request, wherein the at least one parameter comprises a packet size parameter, the packet size parameter comprising one or more of the following: environment variables, configuration items and registry entries, wherein the packet size parameter is adjusted during execution of the query based on query specified results;

generate an extract code based on at least one parameter setting, the extract code including selection criteria and ordering information, the selection criteria comprising a plurality of rows of data from a data table, the ordering information comprising an order of primary key (PK) values in the data table; generating a set of conditions within the internal query based on available memory for data extraction and transfer, the set of conditions comprising a condition that portions of the data extracted as a result of the generated extract code do not exceed the available memory;

extract a batch of the data using the generated internal query;

update the set of conditions based on the extracted batch of the data and remaining available memory, wherein, when the extracted batch of data exceeds the remaining available memory, updating the set of conditions comprises tightening the set of conditions to select a smaller set of data, and when the remaining available memory is not fully utilized by the extracted batch of data, updating the set of conditions comprises relaxing the set of conditions for a subsequent extracted batch of data such that the remaining available memory is better utilized, wherein the PK values are utilized in generating a subsequent internal query for the subsequent extracted batch of data; and extract another batch of the data using the generated internal query with the updated conditions.

18. The computer system of claim 17, wherein the processor is further operative to:

continue to extract the data in batches by updating the set of conditions of the internal query for each extraction until all requested data is extracted.

19. The computer system of claim 17, wherein the processor is further operative to:

continue to extract the data in batches by updating the set of conditions of the internal query for each extraction until a control parameter is reached.

20. The computer system of claim 19, wherein the control parameter is a specified row count.

* * * * *